(12) United States Patent
Lange (10) Patent No.: US 7,715,701 B2
(45) Date of Patent: May 11, 2010

(54) CAMERA SYSTEMS, METHODS AND UNITS THEREFOR

(76) Inventor: Frederick M. Lange, 8112 Cypress Dr. N., Fort Myers, FL (US) 33967-3122

(*) Notice: Subject to any disclaimer, the term of this patent is extended or adjusted under 35 U.S.C. 154(b) by 297 days.

(21) Appl. No.: 11/820,767

(22) Filed: Jun. 20, 2007

(65) Prior Publication Data
US 2007/0297778 A1 Dec. 27, 2007

Related U.S. Application Data

(60) Provisional application No. 60/815,366, filed on Jun. 21, 2006.

(51) Int. Cl.
*G03B 37/00* (2006.01)

(52) U.S. Cl. ............ 396/19; 348/84; 348/85; 356/241.4; 15/104.33

(58) Field of Classification Search ............ 396/17, 396/19, 25; 348/84, 85; 356/241.4, 479; 600/110, 132; 15/104.33
See application file for complete search history.

(56) References Cited

U.S. PATENT DOCUMENTS

| 5,457,288 | A | * | 10/1995 | Olsson | 174/117 R |
|---|---|---|---|---|---|
| 5,754,220 | A | * | 5/1998 | Smalser, Sr. | 348/84 |
| 5,862,561 | A | * | 1/1999 | Irwin | 15/104.33 |
| 5,879,285 | A | * | 3/1999 | Ishii | 600/110 |
| 6,162,085 | A | * | 12/2000 | Chugh et al. | 439/467 |
| 2003/0142007 | A1 | * | 7/2003 | Ono et al. | 342/70 |
| 2008/0314510 | A1 | * | 12/2008 | Hood | 156/221 |

* cited by examiner

*Primary Examiner*—Rodney E Fuller
*Assistant Examiner*—Linda B Smith
(74) *Attorney, Agent, or Firm*—Doonan Dwight McGraw

(57) ABSTRACT

A system whose most common use is that of inspecting conduits such as sewers, drainage pipes, water, gas and oil conduits. The system comprises the following individual components: a rotary contact assembly, a control unit, a push rod assembly, and a video camera assembly mounted on a carrier. It also includes a video display unit which may be on the carrier or separately provided. Each of these components may be easily disconnected and reconnected so that any failed component can be determined and replaced in the field, yet maintaining the system's integrity against damage from the type of effluent in which it is required to operate. There are novel splices for damaged wires and/or push rods. Such splices are for damage repairs and changes in length of push rod assemblies which can done in the field instead of having to return the entire system to have any repairs made.

16 Claims, 5 Drawing Sheets

CAMERA SYSTEMS, METHODS AND UNITS THEREFOR

Priority is claimed based on the U.S. Provisional Application Ser. No. 60/815,366, inventor Frederick M. Lange, having the title of "Camera System and Units Thereof" and filed in the United States Patent and Trademark Office on Jun. 21, 2006. That application is hereby incorporated herein by reference.

BACKGROUND OF THE INVENTION

Cameras are currently being used in a unitary manner with a video receiver, a cable connecting a video receiver and the camera, and a control system for controlling the camera. Such systems are often used by plumbers and other related occupations for inspecting a conduit and often for finding the exact location and nature of a fault in a conduit or pipe system, whether it be a supply of water, fuel or waste matter. At the time of making this invention there were no camera systems on the market that did not require return to the manufacturer or a special repair station for even the simplest repair or replacement. This is also true at the time of filing this patent application. This has caused, and continues to cause, lengthy down time to return, have the repair made, and receive the repaired part, and expense for the customers using such equipment.

1. Field of the Invention

The invention relates to remote camera systems wherein there are currently only systems units that are currently usable and replaceable only by highly qualified technical personnel, and are not adapted to having each unit of the system replaceable in the field. The expression "in the field" means at the site that they are being used or at a local shop in the area where they are being used that does not have the highly qualified technical personnel that the manufacturers of the current systems employ. The units of these systems include cameras, controls, and video equipment with a specialized cable connecting the units. The invention changes this, making each unit of the system being readily replaceable in the field without requiring the services of highly qualified technical personnel. Each unit has been especially modified to be simply removed and replaced.

2. Description of the Related Art

In the current practice wherein a small video camera is introduced into a conduit such as a sewer in order to either inspect it to determine its present condition, or to locate a damaged area precisely which may then be patched or otherwise repaired. Such a device is mentioned in U.S. Pat. No. 6,276,398, for example, finding where the damage that needs repair is located. Camera systems of this type have become very specialized, so that each part of the system that may have failed is shipped back to the maker or distributor who maintains a repair facility to correct the failure. This requires that the system be away from its place of usage for an inordinately long period of time each time that there is a parts failure, and has become quite expensive, not only for the direct cost in shipping as well as the danger inherent it the items shipped can be damaged during shipment both to and from the repair center, and upon occasion even be lost for a period of time. There are also relatively high costs being charged for labor and materials and another high cost of lost time where the system cannot be used. When there is something wrong with a sewer or other conduits, there are usually high costs due to the loss of the contents causing damage to the area as well as having that particular system even temporarily out of commission. Also currently, the various components of the systems that have been available are so designed and configured that they can only be connected with and operate fully with other special components such as a particular video monitor and particular cameras and electronic controls, as well as a particular cable push rod. For example, the electronics for the control of the camera are housed in their video monitors have been integrated with those monitors to the extent that they are not readily removable and replaceable, particularly in the field, but require the servicing to be done in a repair center by higher qualified technical personnel, nor are the other parts of the system are usable with virtually any readily available video equipment that has a standard video input receptacle. Yet, the idea of having all of this in one piece of equipment has been said to be an economic cost savings, neglecting to consider the very high costs of returning all such items for repair as well as the costs relating to down time that the equipment cannot be used.

BRIEF SUMMARY OF THE INVENTION

The system and units thereof embodying the invention include a conduit inspection video camera, a cable push rod, the electronic controls for the camera, and a carrier for the cable push rod and the electronic controls. The camera and the electronic controls are such that they are compatible with any video equipment or recorder that has an input video jack. The camera is quickly and easily connected to and removed from an end of the control push rod, since the control push rod or cable also contains the necessary wiring and connections to connect with the camera at one end and to connect with the electronic controls for the camera at the opposite end. These connections are all the plug-in type, which have not been successfully accomplished and marketed before this invention. The cable and control push rod assembly has plugs on each end so that the camera may have one end of the cable plugged into it, and the electronic controls may also have the other end of the cable plugged into it. A sturdy rotary contact assembly provides the requisite connection from the control panel to the cable push rod assembly that is on the rotatable reel of a carrier. The control box assembly contains the control panel and the control system. The control box assembly and the cable push rod are also supported by the carrier. Even when the cable push rod assembly is fully unreeled for use, one end of it is still operatively connected to the control box assembly through a rotary contact assembly. The other end is connected to the camera assembly. The electronic controls have an output cable which can be connected to any video equipment having a standard video input. This includes video recorders, DVD recorders, VHS recorders, even iPods and MP3s, as well as various video viewing screens such as television screens and computer screens. All of this, other than the video equipment, is compactly supported by a carrier that includes the reel for holding the cable (which is also called the control, the cable push rod, or the push rod assembly). The video equipment, or a combination of more than one piece of such equipment, may be located a short distance away from the carrier and the system parts that are supported on the carrier. They can even be also located at other sites such as an office, with the signals to them being transmitted in any of several manners. While the system shows the video equipment connected to the control box assembly by wiring, it is to be understood that this may alternatively be a wireless connection such as is now well known and is in common use in many computer installations. Since the electronic controls are no longer in the video equipment, any video equipment having a standard video input receptacle may be used. With the advent of the inventive system and units of that system as disclosed herein, each of these units can be replaced by the customer that is using the system, making the ability to return the system quickly into operation. The customer/user only has to either stock some spare units or to have them available to him within hours, commonly overnight, instead of days. Spare video equipment is now sufficiently inexpensive to easily have some spares when needed. They have virtually become throwaway products because of their low purchase costs. That cannot be said of the combined controls and monitors in other systems. Then, the defective unit or units may be taken out of service for repair if that is absolutely necessary, but not without causing any down time and all the other costly consequences of that. Experience has already shown that even a camera lens, for example, can be easily replaced by someone with no particular skills. This is never even an option with the other currently produced systems. Different ones of the systems that have been available for some years have so customized their combined monitors and controls that at many times no one system can even use such parts of another system. This also adds to costs for the user that were and still are unavoidable with those systems.

DETAILED DESCRIPTION OF THE INVENTION

Figure 1:
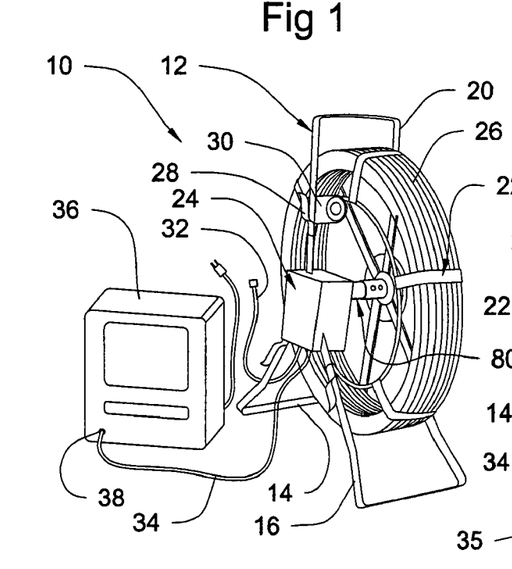
FIG. 1 is a simplified illustration of the entire system where a camera is used and the desired video equipment is connected that can give the operator a view of the interior of the conduit as the control push rod of the cable pushes the camera into the conduit being inspected, a recording of the video information being sent by the camera to the appropriate video equipment, for example. A control box assembly provides the electrical and video signal connections to the other units of the system. Connections between any two of the units noted is by a male/female plug arrangement.
Figure 2:
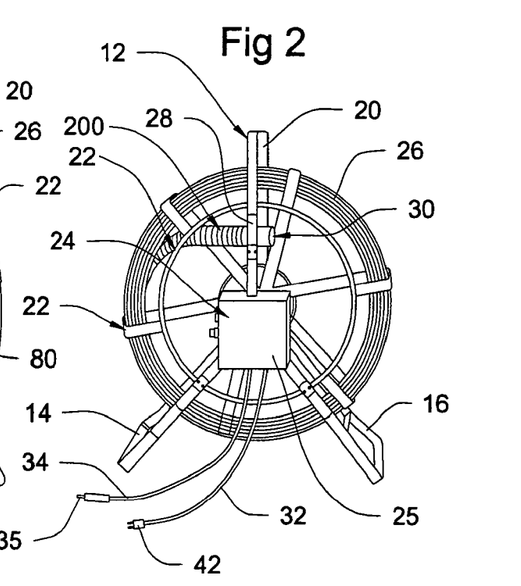
FIG. 2 is an elevation view of the carrier having on it the push rod assembly with the camera on one end, the bulk of the push rod assembly being wound on the reel part of the carrier, and the electronic controls being mounted on the carrier as well. Also shown are the power cord and the video cable for respectively connecting the electronics to electric power and to the desired video equipment. Connections between any two of the units noted is by a male/female plug arrangement.
Figures 3A, 3B:
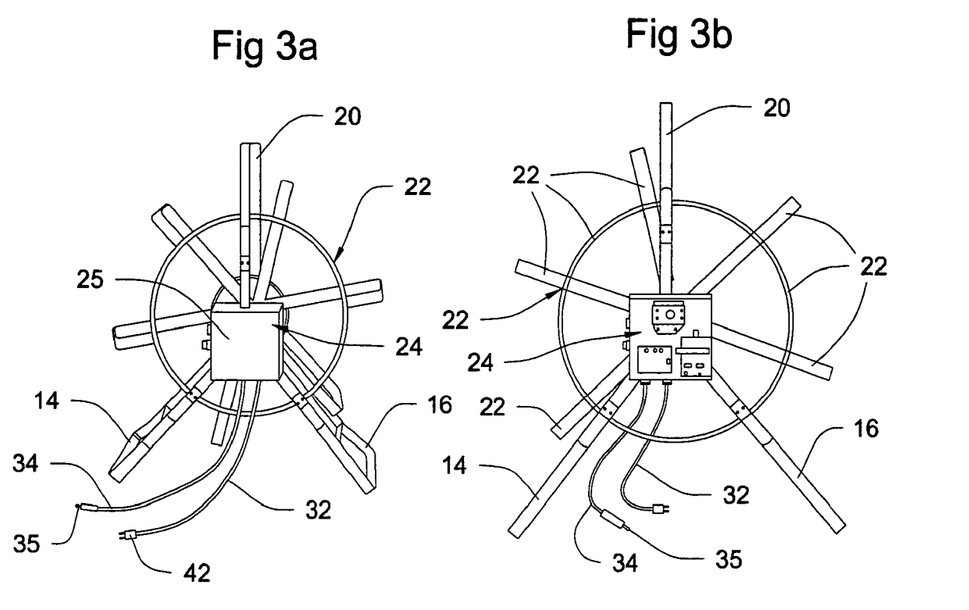
FIG. 3A is similar to FIG. 2, but shows the push rod assembly having been unwound from the reel of the carrier because it has now moved the camera on one end of it well into the conduit being checked.
FIG. 3B is similar to FIG. 3A, but shows the reel when there is no push rod assembly currently installed, whether that is because the unit is being built or the push rod assembly is being replaced.

The system 10 embodying the invention is shown in FIG. 1 as including a carrier 12 having support legs 14 and 16 supporting a stationary hub 18, a carrying handle 20, a reel 22 which is rotatable on hub 18, a control box assembly 24, a push rod assembly 26 wound on the reel 22, a receptacle 28 for holding a small video camera assembly 30 when the system is not in use and has the push rod assembly 26 coiled up on the reel 22, a power cord 32 and a video cable 34 having a standard video input plug 38 on its end. The system also has video equipment 36 which may include a video recorder or some other type of video equipment. The video cable 34 is connected by its standard input plug 35 to the standard video signal input connection 38 of the video equipment 36, as well as being operatively connected to the camera assembly 30 through the control box assembly 24 and a rotary contact assembly connector 80, better seen in FIGS. 7A, 7B, 7C and 7D, and the push rod assembly 26. FIG. 2 also shows much of the system except for the video equipment 36. That Figure better illustrates the camera 30 in its storage position on the carrier 12. FIG. 3A shows the carrier with the push rod assembly 26, together with its camera assembly 30, having been reeled out from the reel 22 of the carrier 12. This is typical when the camera and the push rod assembly are within a pipe connection such as a sewer pipe that is being inspected by using system 10. FIG. 3B is similar to FIG. 3A, but shows the control box assembly 24 in somewhat greater detail, with its cover 25 off. All of the controls within the control box assembly 24 may be removed when the box assembly cover 25 is off. FIG. 3B also shows the push rod assembly 26 having been removed or not yet installed on reel 22.

The system 10 has all of its other parts completely separate from the video equipment 36, other than being connected to receive power through cord 32 and video signals through cable 34. Conversely, in current systems of the type produced for many years, the video monitor that they use also includes the various electronic controls such as at least some of those in control box assembly 24. Such controls are in an integrated unitary arrangement with their systems' own special video monitor that does not work with at least most if not all other long-standing competitive systems. That is one of the reasons for the immediate success of this invention—no part of the inventive system, including the video equipment and the control box assembly, has to be shipped to a factory repair facility. In the other current systems being sold, the equivalent of the entire push rod assembly 26 and the camera 30 are treated as a single unit, being absolutely integrated by design. This results in having to ship that entire assembly to a specialty repair shop or the manufacturer's repair facility whether or not both of them have problems that require repair. At the same time, owners or users of those systems still have a monitor and controls that can usually be used only with the parts shipped out for repairs. The system embodying the invention herein shown and claimed has no part that has to be removed and shipped to the manufacturer or a specialty repair shop with the result that the entire system inoperable until it is shipped, repaired, and shipped back to the user. Users seldom keep separate systems for their system, such as the combination push rod assembly and the camera. By keeping the controls in the control box assembly 24 separate from the video equipment 36, if all or any part of the video equipment being used fails, the bad one is disconnected, another one plugged in in its place—and the replacement can be any available video equipment such as one used with desktop computers, the video monitor of a laptop computer, or any piece of video equipment such as ordinary television sets, and even video recorders, MP3s, iPods and the like. It does not have to be shipped anywhere. This is unique in the current market, and, together with the plug connections between the controls in the control box assembly 24, the cable push rod 26 and the camera assembly 30, with their connectors, the system embodying the invention is much easier to maintain. If one cannot readily determine which part has been damaged or has failed, it is relatively simple to find which part has failed when a failure occurs, because spare parts less expensive to keep on hand, and even unusual ones, such as a camera lens, for example, are available to most areas by overnight shipment; and they can be easily installed by the typical user with the immediate on-site replacement or repair being made. This minimizes cost of down time and eliminates the added expense of shipping parts, or the entire system, to an often distant repair facility, as well as the currently high cost for accomplishing the repair, even if it is in fact a very minor part that needed replacement or repair that needed no special skills to replace or repair such parts. Users of other such systems have commonly been charged more than $1,000 for the replacement of a $10 part, with the cost of about a week's down time as well. The system embodying the invention eliminates that $1,000 charge and that long down time. The $10 part can be shipped overnight for a few dollars, making the total material and shipping costs being less than $50 in the usual case. While this type of system may seem obvious once the system is demonstrated, the industry has been functioning for many years under the return-it-to-the-supplier or a repair facility, with all of the high costs inherent in that arrangement, because no such system as is now disclosed and claimed has been made available. It is one of the cornerstones of invention that when there has been a long-enduring need of a product, such as the actual uses of the other camera systems, and that need is finally met, it is very strong evidence of invention in conceiving and making the device or system that met that need. Without the invention having been made, it is reasonable to believe the invention still would not be made available by any of the current manufacturers and sellers, and therefore the invention that met the need has de facto been unobvious heretofore. This is certainly the case in this instance. In a very few months after the filing of the cited priority application, products practicing the invention were placed on the market in very limited quantities, and have begun to meet those long-felt needs. These products were not publicly known or available until some time after the filing of the priority application, and they have already received many accolades and testimonials from users who have already saved thousands of dollars in repair and down times as compared to other such systems.

Figures 4A, 4B, 4C, 4D:
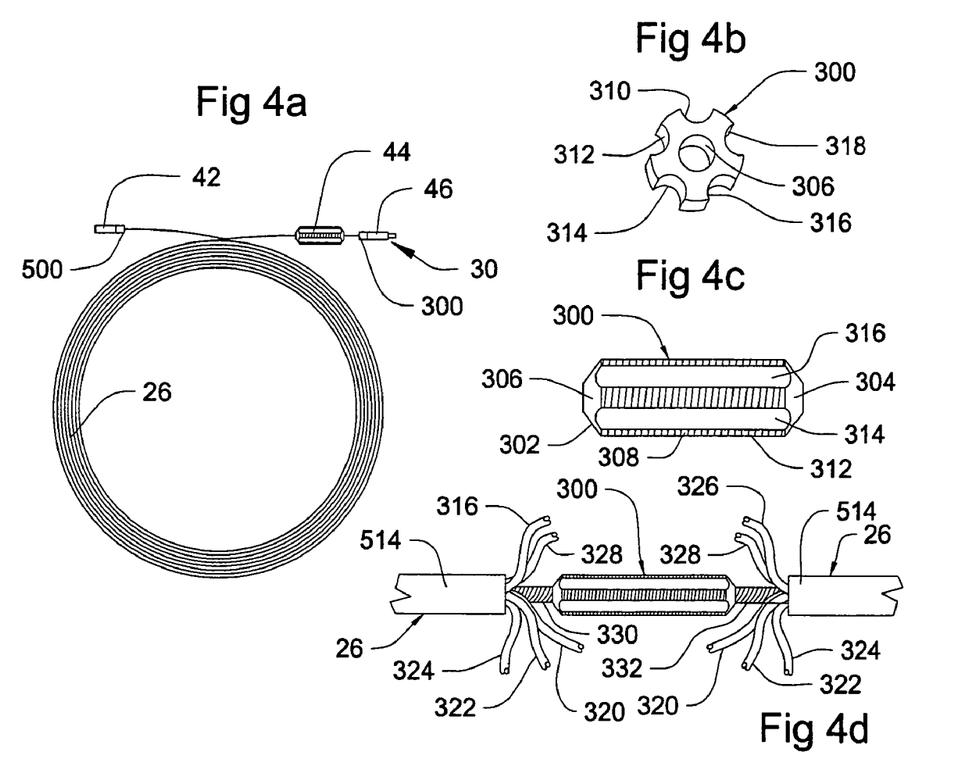
FIG. 4A shows the push rod assembly, coiled with its two connections respectively on its opposite ends, with those connections being easily connected and disconnected from the camera at one end and the electronic controls at the other end since they also are a male/female plug arrangement. It also shows the locking sleeve that locks the push rod cable into the spring housing where it plugs into the camera unit.
FIGS. 4B, 4C, 4D, 4E, 4F, 4G and 4H respectively illustrate the making of the splice for the push rod connector for the push rod assembly of FIG. 4A and the elements of such splice, and a splice-like connector that is also used to connect each unit of the system to a simple male or female plug as appropriate for the installation of that unit or for its removal and replacement of a similar unit.
Figure 4E:
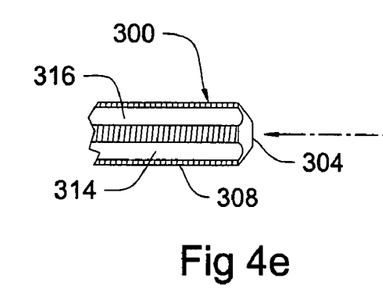

FIG. 4A shows the push rod assembly 26, coiled and secured so that the opposite ends thereof are exposed. One end terminates in a connector plug 42 and the other end terminates in a connector plug 44. The length of the push rod assembly 26 is not as critical with this system as it is with other systems on the market. It has been found that most push rod assemblies being used are about 150 feet to 200 feet long, and so those lengths are usually stocked. However, there are times that a push rod assembly may be needed which is as much as 300 feet to 400 feet, and they are not readily stocked in such lengths. The push rod assembly being provided as a part of the invention herein disclosed, has connector plugs at each end so that two or more shorter cables may be readily connected to form a longer push rod assembly, and the outer end still simply plugs into the camera assembly 30. In current push rod assemblies available on the market, the customer must solder the cable at one end to the carrier and the other end to the camera. That makes it very difficult to add an extension to the push rod assembly. The connector plugs used in practicing the invention herein disclosed require no such soldering. Splices 300 and 300' that are required to be made from time to time are shown in FIGS. 4B through 4H, and will be described below. These splices 300' are important parts of the entire system. They contribute to the system being able to achieve a repair or replacement of parts in the field, with minimal down time.

The splices 300' shown are those that are at times used when connector plugs such as the plugs 42 and 44 are to be attached to the push rod assembly at each end. See FIG. 4A, for example. Likewise, the same type of splices 300' are used to attach the plug for the camera, as well as being used for every unit that can be easily removed and replaced. In those instances where the splice is used to attach either a male or female plug to a unit, the splice is identified by reference number 300'. That applies to the camera itself, as well as the spring unit 200 of FIGS. 5A through 5E. This is shown as a part of FIG. 4G. At other times, a damaged part of a push rod assembly 26 has to be removed and reconnected in the field. Both the wires 320, 322, 324, 326 and 328 in the cable push rod assembly and the push rod 330 itself have to be spliced so that they will perform satisfactorily after the connector plug is attached or the repair is made. See FIGS. 4A through 4H for these wires and the push rod.

FIGS. 4B and 4C show a hard plastic, and preferably a fiberglass, splice fitting or core 300 that is used to keep the spliced wires 320, 322, 324, 326 and 328 in alignment so that each wire from one end of the assembly 26 still matches the same wire from the other assembly end. In appearance, the splice core 300 looks much the same as if it were a short length of the fitting 502, shown in FIG. 9. The splice core 300 is of sufficient length to accommodate the splices of all of the wires and of the push rod. This may require only a short length, usually about ½ or slightly more of an inch or 2.54 centimeters. Its ends 302 and 304 are preferably beveled, and it has a center opening 306 extending longitudinally throughout its length which receives both ends of the push rod part of the assembly 26 where the splice is to be made. The outside surface 308 of the splice core 300 is fluted with recesses 310, 312, 314, 316 and 318 which will respectively receive one end of the bare wires at the splice scene where the splice is to be made. In this description, it is considered that five wires, and thus five recesses in the fitting 300, are used. It is within the purview of the invention that more or less wires may be used, to accommodate modified push rod assemblies. While there can also be less than five recesses in some splice cores 300, the five-recessed cores may be used with a lesser number of wires with no problem. They would just be filled with epoxy resin as will become apparent later.

Figure 4F:
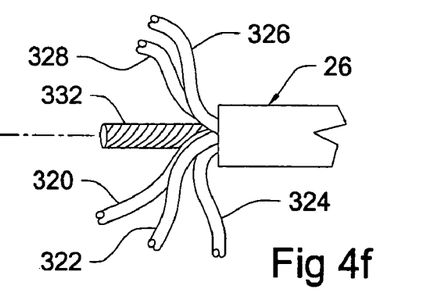

The first steps in making the splice to eliminate a damaged section of a push rod assembly 26 include the preparatory steps of (a) removing the damaged portion of the push rod assembly 26 by completely severing the push rod assembly on each side of the damaged portion of the push rod assembly, (b) removing the outer casing 514 covering from each of the newly created temporary push rod ends 330 and 332 for a distance that is about ¾ of the length of the splice core to be used to allow for access to the wires 320, 322, 324, 326 and 328 to be splayed as seen in FIGS. 4D and 4F, (c) splaying the five wires 320, 322, 324, 326 and 328 from each splice end as seen in FIGS. 4D and 4F, ((d) after which the lengthwise portion of the push rod assembly fitting 502 is removed, that portion having been uncovered by removing the outer casing 514 portion and splaying the wires, and (e) removing all insulation from the each of the wire ends for a distance that is over half the length, and preferably no more that the full length, of the recesses 310 through 318 of the splice core 300. In performing the preparatory steps (a) through (d) the newly created temporary push rod ends 330 and 332 are bared, as shown in FIGS. 4D and 4F. The steps of making the splice and returning the push rod assembly 26 to its usable condition are then taken. In step (f), coating the ends and exposed surfaces of the temporary fiberglass rod cores ends 330 and 332 at each splice end with epoxy rein over their exposed surfaces, and immediately (g) inserting these two ends 330 and 332 into the bore 306 of the splice core 300 with each push rod splice end 330 and 332 preferably extending about half way through bore 306 so that these ends abut each other at or near the middle of that bore. The epoxy will set and form a bond between the wall of core bore 306 and the outer surfaces of the two rod core ends 330 and 332. At this time, the splice will appear as seen in FIG. 4G.

Figure 4G:
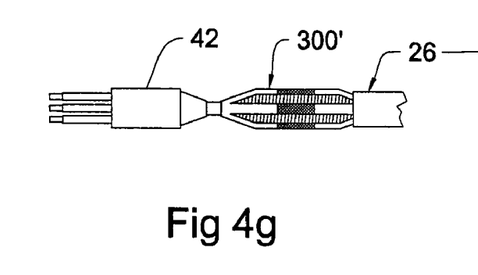

The next steps are to (h) place each of the two sets of wires 320, 322, 324, 326 and 328 from each splice end respectively into the five longitudinally extending recesses 310, 312, 314, 316 and 318, so that they are connected, and (I) soldering each of their connections of one wire 310 of one wire set to the other wire 310, etc., of the other wire set as they remain in the recesses, as seen in FIG. 4G so that the wires 310 of each wire set are soldered together, the wires 312 of each wire set are soldered together, etc., until the same-numbered wires of each wire set are soldered to the same-numbered wires of the other wire set. Step (j) is the covering with these wires, their recesses, and the splice core with epoxy resin so that they are not exposed to the atmosphere at all. Even before the epoxy resin has set and is hard, step (k) is performed. In this step, the entire splice is then covered by wrapping a heavy duty shrink-fit material which will extend longitudinally to the end of the spliced area identified as the ends of the original covering of the push rod assembly 26, and that material is then heated to shrink it and finish the splice. It is preferable that it be wrapped so that after shrinking it is at about the same diameter as the diameter of the original covering's outer surface. Alternatively, instead of using heat shrink material, it is most practical to use a cloth material soaked in epoxy resin by wrapping it about the splice so that the entire splice is covered with it, until its outer diameter reaches substantially the same outer diameter as that of the push rod assembly cover, and allowing the epoxy resin to harden. One of the materials so used is a cotton twine. Other materials that can be saturated with epoxy resin and wrapped in a similar manner are considered to be within the purview of the invention. This last step and the material used is considered very desirable when the assembly is to be used in unclean places such as sewers. It effectively replaces the removed push rod assembly cover 26 material that was removed in preparation for creating the splice, and seals the splice against water intrusion.

FIGS. 5A through 5E show the spring assembly or unit 200. This assembly is provided to ease the cable around bends in the conduit being checked. The spring 202 is a tightly coiled spring having a ball stop 204 on one end and another ball stop 206 on the other spring end. These ball stops are connected by two stainless steel cables 208 and 210 extending through them and secured to the ball stops. Ball stops 204 and 206 fit into the stainless steel fittings 212 and 214 that are welded on either end of spring 202. Ball stop 204 and fitting 212 provide a lock unit 211 and Ball stop 206 and fitting 214 provide a lock unit 213. Lock unit 211 operatively locks the camera head assembly 30 to the outer end of the cable push rod assembly 26 via the spring assembly 200, that has the push rod core 500 in it. One stainless steel fitting 212 accepts the camera housing assembly??? and locks it in using set screws 216. The fitting 214 accepts the locking sleeve 215 that is on the cable push rod assembly and locks it in with other set screws 216. In this manner, the unit, including the camera 30 assembly and the spring assembly 200, becomes integral with, yet disconnectable from, the cable push rod assembly 26, and the camera assembly 30 becomes integral with, yet disconnectable from, the spring assembly 200. The inner end of the push rod assembly 26 is similarly connected to the rotary contact assembly 80 through a similar lock unit 211'. Thus, while forming a strong locked connection, each of the components 26, 30 and 200 can be individually replaced in the field when needed.

Figure 6A:
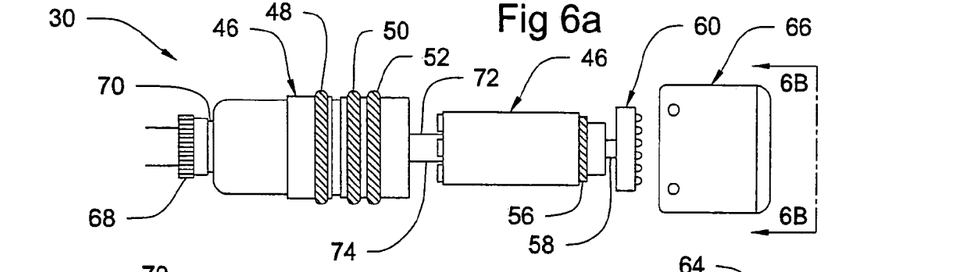
FIGS. 6A, 6C and 6D show a breakdown of the camera housing, with FIG. 6D showing parts in an exploded view. They include the water seals for the cable and the main camera body.
Figure 6B:
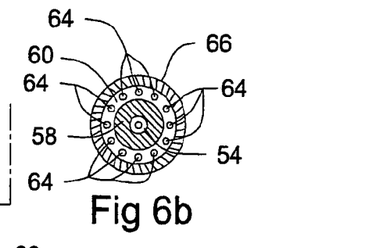
FIG. 6B is an end view of the camera assembly, taken in the direction of arrows 6B-6B of FIG. 6A, showing the end thereof which contains the camera lens and the light ring for lighting the area that the camera lens is viewing.
Figure 6C:
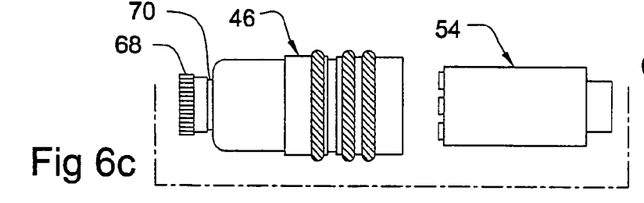
Figure 6D:
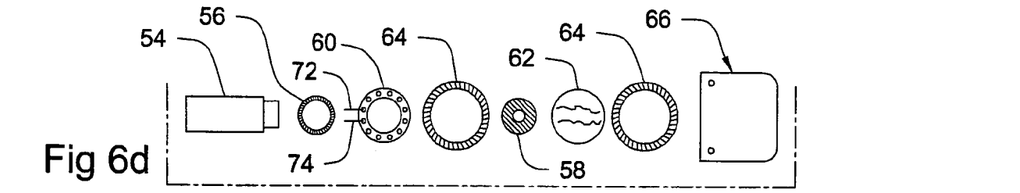

FIGS. 6A, 6C and 6D are exploded views showing details of the camera assembly 30. Because this is also a separate unit that may be removed and replaced, several different cameras may be used as desired. At times, for instance, a camera has to be smaller than the standard camera that was provided with the system. It is simply a matter of unplugging one camera and plugging in another camera having the needed feature of size. Of course, other cameras having some desired feature for some particular job can be similarly substituted as needed. FIG. 6B is an end view of the assembly 30, looking into the open end of the camera lens cover and holder 66. Assembly 30 includes the camera body 46, O-rings 48, 50, and 52, the camera 54, O-ring 56, a rubber washer 58, the LED light ring 60 which has within it the glass lens cover 62 and its O-ring 64, and the lens cover and holder 66. Nut 68 is a nut that is threaded over the end 70 of the camera body 46. It has an O-ring, not shown, under it which provides a water seal for the cable control rod. Wires 72 and 74 schematically illustrate the connections to the cable push rod assembly 26, which is in turn connected to the control box assembly 24. Through these wire connections power is provided to the camera 54 and the video signal from the camera is sent back to the control box assembly 24.

When the camera assembly 30 is fully assembled, it is watertight. The camera 54 is received partially within the camera body 46 and partly in the lens cover and holder 66.

The lens cover and holder 66 fits over the light ring O-ring 64, the camera 54, the O-rings 52, 50 and 48 of the camera body 46, effectively sealing the camera 54. Its glass lens cover 62 which also covers the LED light ring 60, protecting those parts and the camera lens 76 that extends through the rubber washer 58 as is seen in FIG. 6B.

FIGS. 7A, 7B, 7C and 7D illustrate several views of the rotary contact assembly 80 that transfers power and video signals between the control box assembly 24 and the cable push rod assembly 26, which is mounted on the rotatable reel 22 and thus rotates with the reel, to camera assembly 30. This rotary contact assembly 80 has been developed to provide a good, solid means for transferring signals and electrical power to the rotating cable reel 24 and therefore to one end of the cable push rod assembly 26 which rotates with that reel as the cable push rod assembly is paid out as the camera assembly 30 is inserted into a conduit and pushed through that conduit while the camera looks for any damage to the conduit. It performs that function in an outstanding manner, and is considerably more sturdy than many other commercially available rotary contact assemblies.

Assembly 80 has a center spindle 82 that has copper rings 84, 86, 88, 90 and 92 thereon, separated by insulated dividers 94 from each other and from the stationary hub 18, which is effectively a part of the assembly 80. The spindle 82 rotates within a bearing 96 that is made of an insulated type of material that has an extremely long wear life so that its use in this system is for all practical purposes good for the life of the system. Assembly 80 is designed to simply screw into the control box assembly 24 that is a part of the system 10, and can be easily removed and replaced by the customer in the field when needed. There are five such copper rings shown because in the system there are five wires to be connected between the control box assembly 24 and the cable push rod assembly 26. There are therefore five wiper contacts 100, 102, 104 106 and 108, respectively being in engagement with the copper rings 84, 86,88, 90 and 92. Wires 110, 112, 114, 116 and 118 are respectively connected to the contacts 100, 102, 104,106 and 108, and are insulated from each other. They are in turn operatively connected to the control box assembly 24. Each of the copper rings 84, 86, 88, 90 and 92 is operatively connected to one of the wires 120,122, 124,126 and 128 leading to the wires in the cable push rod assembly 26 having those same reference numbers as those wires have.

Figure 7A:
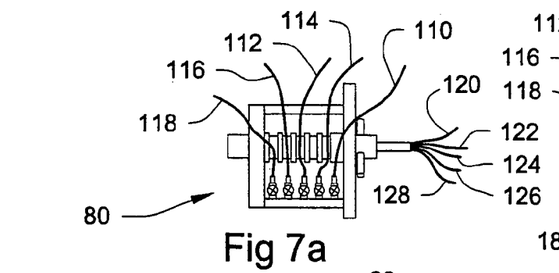
FIGS. 7A, 7B, 7C and 7D are various views of the rotary contact assembly which provides a solid means of transferring signals and power to the cable frame as it rotates.
Figure 7B:
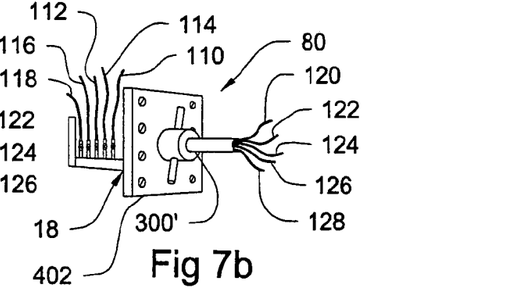
Figure 7C:
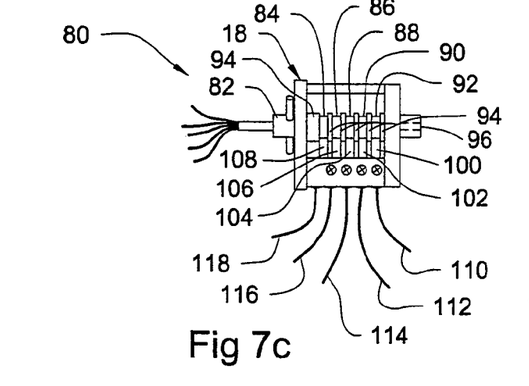
Figure 7D:
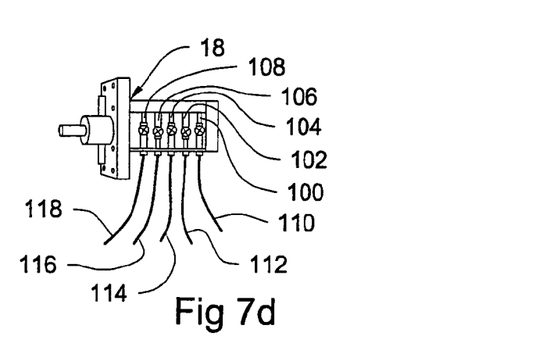
Figure 8:
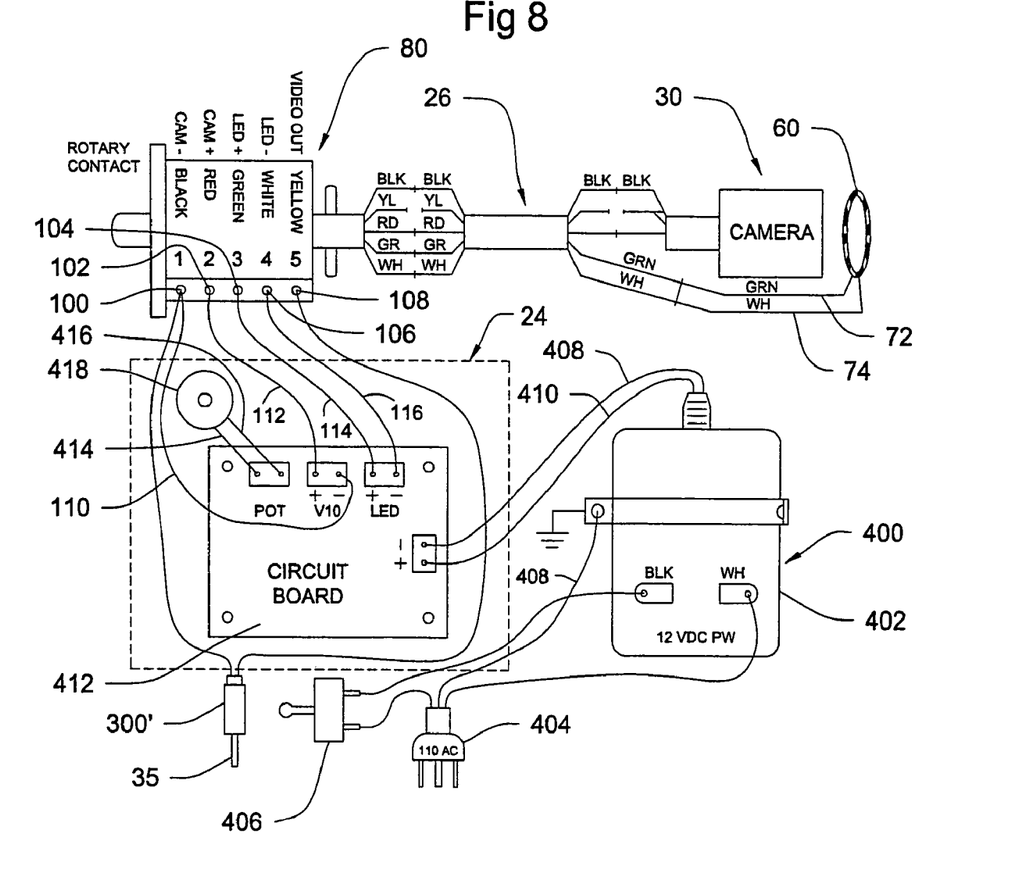
FIG. 8 is a schematic drawing of the electrical components that control the functioning of the camera. These components include a rotary contact assembly that provides constant power and a constant video signal to the cable from a stationary point inside the electronic controls box. The locations of the splices used to splice the plugs together are also shown.

The schematic presentation of the system shown in FIG. 8 has as its main components the basic units of the system embodying the invention. These include the control box assembly 24, the rotary contact assembly 80, the cable push rod assembly 26, and the camera assembly 30. It also includes the power supply 400. The power supply may be a 12 volt system such as that commonly found on most vehicles, including those that would bring the system to the location where it is to be used. It is therefore represented in the schematic by the 12 volt outlet of a transformer 402. The transformer may be connected to an alternating current supply if there is one available, as shown by the plug 404 and the wiring that is connected to the transformer via an off-on switch 406. The alternating current ground wire 408 is also shown as being connected to the transformer so that its housing is also grounded. The wires 408 and 410 from the battery or the transformer 402 are connected to the positive and negative connections on a circuit board 412 which is a part of the control box assembly 24. There are three connections of positive and negative wires leading from the circuit board 412. The first pair of such wires 414 and 416 are connected to a potentiometer 418 which will control the dimming of lights. The second pair of such wires are the wires 110 and 112, also shown in FIGS. 7C and 7D, which are connected to the first two wiper contacts 100 and 102 of the rotary connector assembly 80. The third pair of wires are the wires 114 and 116 of FIGS. 7C and 7D, which are connected to the second two wiper contacts 104 and 106 of the rotary connector assembly 80. The wire 118 of FIGS. 7C and 7D is connected to the fifth wiper contacts 108 of the rotary connector assembly 80 and is also connected to the video plug 38.

Figure 9:
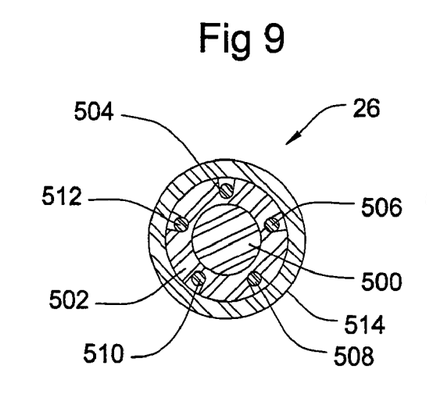
FIG. 9 is a cross section view of the cable push rod which is also a part of the invention.

FIG. 9 shows a cross section of the cable push rod 26. The push rod core 500 is made of fiberglass, and is the part of the push rod assembly 26 that carries the pushing force exerted on the push rod assembly 26 from the reel area to move the camera assembly 30 into the conduit to be inspected or repaired. It is surrounded by another fiberglass or very hard plastic fitting 502 which is similar in cross section to the fittings 300 and 300' noted above. Like those fittings, it has a circumferentially spaced series of recesses in which the copper wires 504, 506, 508, 510 and 512 are located. These wires are also identified herein as wires 320, 322, 324, 326 and 328 when describing the making of splices, and then are particularly referring to the parts of the copper wires that are part of the splicing operation. The outer casing 514 of the push rod assembly 26 covers the above-described interior parts of the push rod assembly 26. Casing 514 is made of a very hard but still slightly flexible plastic which may be a polymer by way of example. It fits very tightly around the wires and the fitting 502 so that, in the manufacture of the cable push rod 26, the interior of the push rod assembly 26 is tightly sealed and has no voids.

Figure 4H:
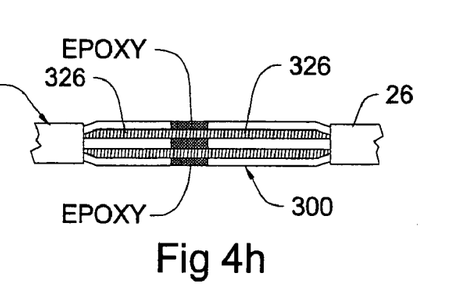
Figure 5A:
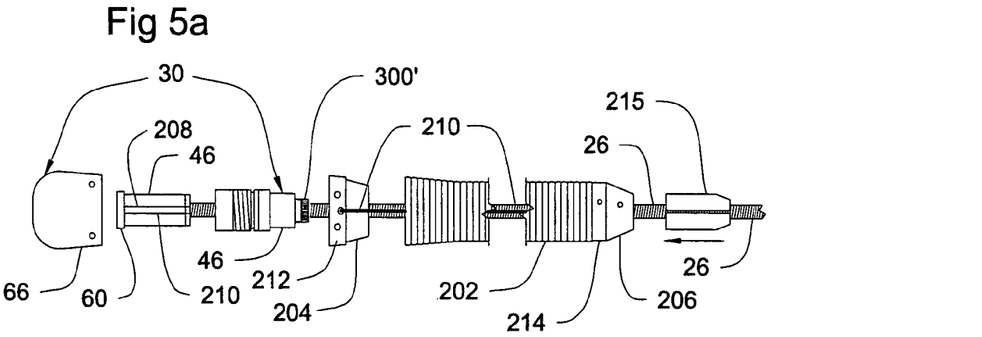
FIG. 5A is a somewhat exploded view of the locking sleeve and the plug end of the cable that is connected to the camera, also shown. The locking sleeve is inserted into the spring housing, and it has set screws on each end of it to lock those ends to the cable end at one end and to the camera at the other end. This spring housing provides the lead flexibility to allow the camera to maneuver around bends in various types of conduits.
Figure 5B:
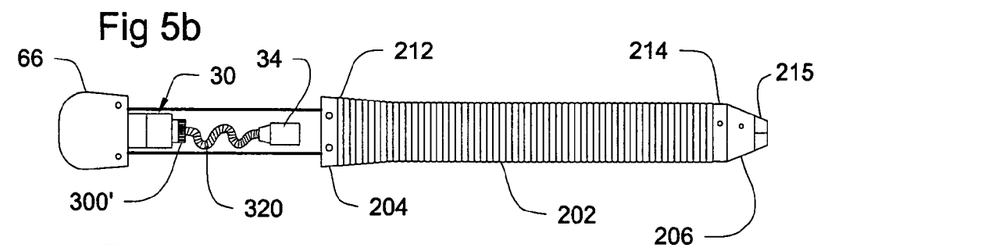
FIGS. 5B, 5C, 5D and 5E show the spring assembly in greater detail. This assembly eases the cable around conduit bends and provides the arrangement to lock the camera head assembly to the cable assembly.
Figure 5C:
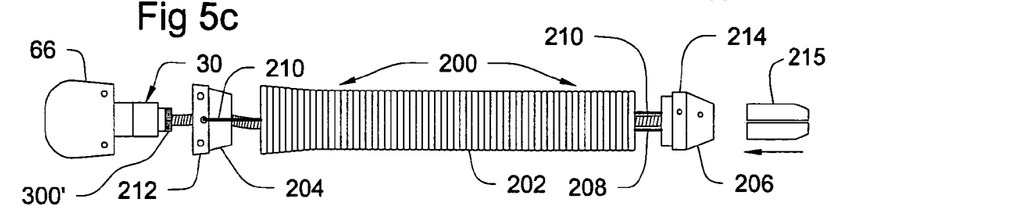
Figure 5D:
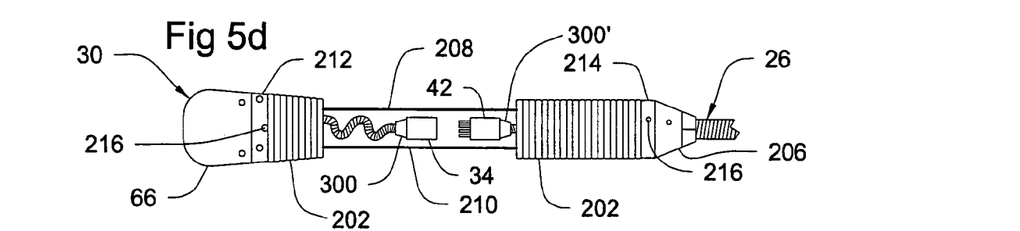
Figure 5E:
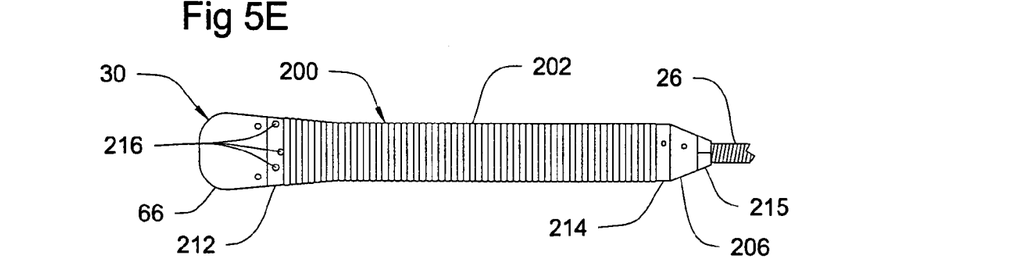
Figure 10:
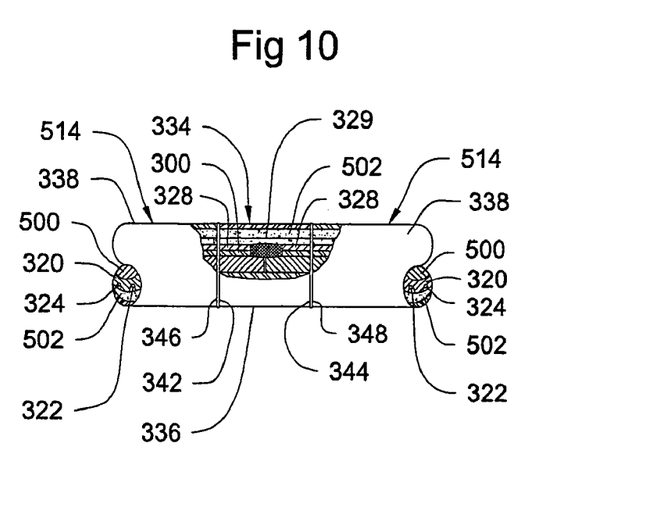
FIG. 10 is an elevation view of a finished splice with portions broken away and in section.

FIG. 10 illustrates a splice such as the one shown in FIG. 4H after the epoxy resin has been applied to the two push rod temporary ends 330 and 332 of the push rod 500, and those ends have been inserted into the center bore 306 of the splice fitting 300, the wires 320 through 328, only some of them being visible in FIG. 10, have been respectively placed in the splice fitting recesses 310 through 318, as shown in FIGS. 4D through 4G, soldered as shown at 329 in FIGS. 4G and 4H, and then covered with epoxy resin. The splice cover 334 has then been applied to the splice so that it covers and seals the splice, with its outer surface 336 having a diameter that is substantially the same as the diameter of the outer surface 338 of the outer cover 514 of the push rod assembly 26, and the edges 340 and 342 thereof sealing the edges 344 and 346 of the outer cover 514.

As earlier described, the splice cover 334 can be a heat-shrink plastic that has been wrapped around the splice until its diameter, when heated and having shrunk, is approximately the same as the diameter of the outer surface 338 of the outer cover 514 of the push rod assembly 26. Alternatively, the splice cover 334 may be a cloth material, such as cotton twine or an appropriate other cloth material that has been soaked with epoxy resin and then wrapped around the splice until its outer diameter is substantially the same as the diameter of the outer cover 514 of the push rod assembly 26. In either instance of the choice of the material of the splice cover 334, after the epoxy resin has hardened, the outer surface 336 of the splice has sealed the splice and with the ends 346 and 348 of that outer cover 514 so that the splice is impervious to water intrusion.

The splice can also be similarly made as shown in FIG. 4G, where the ends of the wires of the push rod assembly are connected to a plug such as plug 42. This same type of splice can be used to attach similar plugs to other parts such as the camera assembly 30, the rotary contact assembly 80, and the control box assembly 24, and the video equipment 36, so that they can be easily plugged in to be connected or unplugged to be disconnected and then can be quickly and easily removed and replaced or repaired as necessary. With this provision of the common design of connector plugs always being attached by use of a splice fitting and the epoxy resin to form a splice, none of these parts should ever be the cause of long periods of down time and the cost of shipping them to special repair centers as has been the case for so many years for such equivalent parts. The only times that a splice need be constructed in the field is when the push rod assembly 26 has been damaged and the damaged section must be removed and a splice put in its place in the push rod assembly in order to be able to use the push rod assembly, or when an added length of push rod assembly must be inserted between the rotary contact assembly 80 and the camera 30 to increase the distance that the camera may be pushed into the sewer or other conduit.

The invention claimed is:

1. A remote camera system normally being deployable in field use for examining the interior of pipe systems carrying liquid and gaseous fluids or a mixture of such fluids, semisolids and solids that may be mixed with such fluids as are usually found in sewer systems, said camera system comprising:

a carrier having a reel rotatably mounted thereon;

a push rod assembly having first and second ends and further comprising" electrical wires capable of sending electrical power and operational signals therethrough, a laterally flexible push rod forming a hard core and extending therethrough;

an impervious cover for said push rod assembly;

a control system mounted on said carrier and operatively attached to said push rod assembly first end, and a source of electrical power for and selectively connected to and disconnected from said control system;

and a special video camera assembly having a camera body operatively attached to said push rod second end and to said electrical wires of said push rod assembly;

said push rod assembly first end also being operatively physically connected to said reel so that, when said reel is rotated in one direction, said push rod assembly is selectively pulled toward a wound-up position on said reel;

and when said reel is rotated in the opposite direction said push rod assembly is pushed toward a selected unwound position off of said reel from its said wound-on position on said reel as said camera examines the internal condition of the pipe system then containing said camera, said push rod assembly being thereafter selectively wound onto said reel to a desired extent for storage or just shortening the unwound length of said push rod assembly, positioning said reel and thus said push rod assembly to the extent needed for deployment in said field use or for repair to one or more parts of said remote camera system;

and first and second disconnectable and reconnectable connections respectively operatively joining said push rod assembly first end to said control system and operatively joining said push rod assembly second end to said video camera assembly, each of said connections being independently disconnected as needed for deployment in field use as well as for repair of one or more parts of said remote camera system;

at times a part of said push rod assembly having at least one damaged area intermediate said push rod assembly first and second ends which has been removed, leaving separated temporary ends of said push rod hard core and said electrical wires, and at least one splice installed that is substituted for said removed at least one damaged area of said push rod assembly, each splice of said at least one splice properly connecting said push rod hard core and said electrical wires;

said at least one splice including a splice fitting having a length through which a center hole extends through which said separated parts of said push rod hard core have ends extending therein and epoxied to said splice fitting, and arcuately separated and lengthwise-extending push rod splice fitting recesses through which said temporarily separated electrical wires are rejoined and extend, said splice being completed by epoxying said rejoined electrical wires, said epoxied electrical wires aid said push rod hard core, after which said splice fitting is covered by a suitable material that bonds with said push rod assembly cover and seals said splice against any contamination.

2. The remote camera system of claim 1, said push rod assembly hard core and said splice fitting being made of fiberglass.

3. The remote camera system of claim 1, said disconnectable and reconnectable connections operatively joining said push rod assembly first end to said control system and joining said push rod assembly second end to said camera assembly.

4. The remote camera system of claim 1, said push rod assembly second end having a spring assembly detachably secured thereto, said spring assembly having one spring assembly end removably secured to said push rod second end, said spring assembly having another spring assembly end removably secured to said camera body;

said camera body comprising opposite inner and outer ends; a plurality of O-rings; a camera having a lens cover and holder, a lens mounted in said lens cover and holder of said camera body and being removable and replaceable in the field by removal of said lens cover and holder, a rubber washer, an LED light ring having within it a glass lens cover and one of said plurality of O-rings, said lens cover and holder fitting over said LED light ring and said one of said plurality of O-rings and forming a tight water-tight seal connection between said lens cover and holder and said LED light ring;

said lens cover and holder being threaded over said camera body outer end and having another of said plurality of O-rings engaged in water-tight sealing relation between said lens cover and holder and said camera body outer end;

said camera thus being water-tight sealed and with said lens cover protecting said camera against water intrusion.

5. The remote camera system of claim 1, said camera body having an inner end, a connection between said camera body inner end and said push rod assembly second end spring assembly, said connection being also sealed in water-tight sealed relation, said connection comprising a nut threaded over said camera body inner end, and having at least one of said plurality of O-rings engaged in water-tight sealing relation between said nut and said camera housing and another of said plurality of O-rings in water-tight sealing relation between said camera housing inner end and said push rod assembly second end spring assembly, said push rod second end spring assembly other end spring assembly outer end extending into said nut to said camera inner end and said electrical wires of said push rod assembly being operatively connected to said camera at said camera housing inner end to provide electrical power to said camera LED light ring and controls to said camera for control of said camera via said control system.

6. The remote camera system of claim 1, said at least one splice being a repair for a damaged push rod assembly which allows said push rod assembly to be severed into two pieces to remove a damaged section of said push rod assembly leaving temporary third and fourth ends of said push rod assembly to be reconnected by said splice, said splice comprising:

said splice fitting being a hard elongated splice fitting having a center opening through which said push rod third and fourth temporary ends are coated with epoxy and then inserted with said third and fourth temporary ends meeting near the middle point of said splice fitting center opening, said epoxy becoming hardened and binding said push rod third and fourth temporary ends with said hard elongated fitting and reestablishing said push rod as a single unit;

said hard elongated splice fitting also having a number of length-wise extending recesses therein at least equal to the number of signal-transmittable electrical wires in said push rod assembly, said signal-transmittable electrical wires also having portions that have been removed to install said splice fitting and creating temporary first and second wire ends for each of said electrical wires, said first and second temporary ends of each of said electrical wires being positioned in one of said recesses where they are joined together in secure relation to be able to transmit signals therethrough as before;

more epoxy having then been applied to each of said electrical wire first and second end sets and to said hard elongated fitting to entrap said electrical wire ends so that they cannot touch each other and forming a hard splice, said electrical wires then being covered with a suitable material that also bonds to said push rod cover and reestablishes the water-proof shield of said push rod assembly.

7. The remote camera system of claim 1, said control box assembly having a rotatable contact assembly , said rotatable contact assembly and said push rod assembly first end having a detachable lock joining said push rod assembly to sais rotatable contact assembly that provides the means of attachment of said control system's operative attachment to said push rod assembly first end.

8. The remote camera system of claim 1, said push rod assembly comprising:

a fiberglass push rod extending for the length of said push rod assembly;

a fiberglass fitting having a center longitudinally extending opening extending therethrough, said opening receiving said push rod therein, said fiberglass fitting also being an electrically non-conductive insulator;

said fitting having an outer surface, said surface having a plurality of longitudinally extending and circumferentially spaced recesses therein extending for the length of said push rod assembly;

and said wiring comprising a plurality of different wires for different purposes and subject to carrying electrical power and electrical signals through different ones of said different wires, each of said different wires extending the length of said push rod assembly and being in a different one of said fitting outer surface recesses;

and said wiring and said fitting having a covering of hard but flexible plastic sealing said push rod and said fitting and said wiring against water intrusion.

9. The remote camera system of claim 6, said push rod core and said at least one hard elongated splice fitting being made of fiberglass.

10. The remote camera system of claim 7 in which said rotatable contact assembly has a stationary hub operatively secured to said control box assembly, said stationary hub having a control center spindle rotatably received thereon by a bearing made of an electrically insulation type of material, said spindle having a series of metallic electrically conductive rings and insulated dividers thereon, said rings being electrically separated from each other and from said stationary hub by said insulated dividers, said control center spindle having said reel operatively mounted thereon so that said spindle and said reel are rotatable to unwind and take up said push rod assembly having said camera thereon, said hub having a series of wiper contacts thereon respectively being in contact with said metallic electrically conductive rings and being insulated from each other, said wiper contacts being in turn respectively connected to said control box assembly control assembly, said rotary contact assembly being removable from said control box assembly and from said reel for repair or replacement as needed.

11. The remote camera system of claim 8, said hard but flexible plastic covering being a heavy duty heat-shrinking plastic which is placed around said wiring and said fitting and heated to be shrink fitted to said wiring and said fitting in sealing relation against water intrusion.

12. A conduit inspection remote camera system having a carrier and a group of units comprising:

a control system mounted on said carrier, a reel rotatably mounted on said carrier, a push rod assembly mounted on said reel for being paid out and being taken in and having one end operatively connected to said control system, said push rod assembly having another end and a remote camera on said push rod assembly other end, video equipment connected to said control system, a rotary contact assembly, wiring within said push rod assembly operatively connected to said camera and said control system via said rotary contact assembly, said wiring transmitting electrical power and control signals to said remote camera and transmitting video signals from said camera to said control system and thence to said video equipment;

each unit of said group of units being selectively connected as aforesaid and being selectively disconnected so as to repair or replace any of said units simply by disconnecting the units selected for removal, and said disconnected units being thereafter reconnected using a replacement unit in the field so that all repairs may be made without any appreciable delay beyond the time to so disconnect and reconnect;

wherein each unit of said group of units that is connected to and disconnected from another unit had a plug of one gender is to be plugged into and unplugged from a plug of the opposite gender, has each of such plugs connected via a splice, said splice embodying the same type of splice as used to repair damaged sections of said push rod assembly, to install said plugs on said units and in said connections to said wiring from said unit which are plugged in when said unit is being placed in service and unplugged when said unit is being taken out of service for any reason, said splices then making it possible to have such plugs to facilitate the installment and removal of any of said units having such plugs.

13. The conduit inspection remote camera system of claim 12 further having said remote camera and said push rod assembly sealed so as to prevent water intrusion into said camera or said push rod assembly.

14. The conduit inspection remote camera system of claim 12, said group of units further including a spring unit secured between said push rod assembly and said camera, said spring unit having means securing it to and selective releasing it from said push rod assembly and said camera for replacement.

15. A method for repairing a damaged section of a substantially constant diameter, flexible and axially extendable and retractable, push rod assembly of a remote camera assembly that has a push rod hard core and electrical wires that are connectable to the camera of the remost camera assembly and control means for the remote camera assembly, such a remote camera assembly being commonly used to inspect the interiors of sewers and other piping systems and at times being subject to being damaged in one or more sections thereof when axially extending or retracting the push rod assembly with the push rod assembly being sufficiently flexible to extend into and through, and retract from, common bends and turns of such piping systems; said repairing method using a splice fitting that when being completed, also has substantially the same outer surface diameter as the substantially constant outer surface diameter of the push rod assembly;

said method for repairing such a damaged section of such a push rod assembly comprising the steps of:

(A) providing such a push rod assembly including the push rod core and electrical wires that extend throughout the length of the push rod assembly;

(B) providing the splice fitting with an axially extending length and an axially extending bore therethrough that is at least as large in diameter as the diameter of the push rod core, and also providing longitudinally extending grooves extending through the splice fitting with those grooves being located at circumferentially spaced locations that are outwardly spaced from the splice fitting bore so as to receive one of the electrical wires of the push rod assembly once they are reattached as set forth below and yet not electrically interconnecting the various circumferentally arranged wire temporary ends with any of the similar wire temporary ends formed as parts of any of the wire temporary ends being located as set forth in steps (E) and (F) below;

(C) removing a damaged section of that provided push rod assembly from the remainder of the push rod assembly, the damaged section including other part or parts of the push rod assembly within the damaged section, by severing the push rod assembly on opposite sides of the damaged section area so that the push rod core has temporary ends as do each of the electrical wires of the push rod assembly once they are severed;

(D) reconnecting the severed push rod assembly where it has been so severed by using the splice fitting and inserting the push rod core temporary ends that are created in step (C) by moving the temporary ends of push rod into the bore of the splice fitting, and gluing them in place using an epoxy resin that glues the two push rod ends together and the parts of the push rod core that engages the wall of the splice fitting bore;

(E) reconnecting the temporary ends of the electrical wires that were created in step (C) by removing sections of wiring having been removed from the damaged section due to damage to said push rod assembly;

(F) placing said reconnected wiring ends of each electrical wire in one of helongitudinally extending grooves of the splice fitting;

(G) soldering said matching wiring ends together as part of either step (D) or step (E); then (H) sealing and securing the electrical wires and said splice fitting and said push rod in place by using hardening epoxy resin, and (I) then wrapping said spliced with heat-shrink heavy duty plastic and heating said plastic to shrink it and seal said push rod assembly portions including said splice, said shrunken plastic having an outer diameter that substantially matches said hard plastic cover substantially constant diameter, said epoxy resin hardening to provide a solid splice that is impervious to water intrusion.

16. The method of claim 15 wherein, after accomplishing step (G) and before acomplishing step (H), there is a sub-step (G') of wrapping a cloth cotton twine material about the spliced area before applying the hardening epoxy resin, after which steps (H) and (I) are performed.

* * * * *